US012792910B2

(12) United States Patent
Li et al.

(10) Patent No.: US 12,792,910 B2
(45) Date of Patent: Nov. 10, 2026

(54) METHOD OF GENERATING MULTIMODAL SET OF SAMPLES FOR INTELLIGENT INSPECTION, AND TRAINING METHOD

(71) Applicant: Beijing Baidu Netcom Science Technology Co., Ltd., Beijing (CN)

(72) Inventors: Shuo Li, Beijing (CN); Lei Nie, Beijing (CN); Xiaowen Xu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 755 days.

(21) Appl. No.: 18/300,217

(22) Filed: Apr. 13, 2023

(65) Prior Publication Data

US 2023/0252295 A1 Aug. 10, 2023

(30) Foreign Application Priority Data

Apr. 13, 2022 (CN) ......................... 202210386910.2

(51) Int. Cl.

| | |
|---|---|
| ***G06N 3/092*** | (2023.01) |
| ***G06N 3/045*** | (2023.01) |
| ***G06N 3/08*** | (2023.01) |
| ***G06N 3/0895*** | (2023.01) |
| *G06V 10/764* | (2022.01) |
| *G06V 10/774* | (2022.01) |
| *G06V 10/778* | (2022.01) |
| *G10L 25/51* | (2013.01) |

(52) U.S. Cl.
CPC ............ *G06N 3/08* (2013.01); *G06V 10/764* (2022.01); *G06V 10/774* (2022.01); *G06V 10/778* (2022.01); *G10L 25/51* (2013.01)

(58) Field of Classification Search
CPC .......... G06N 3/08; G06N 20/00; G06V 10/76; G06V 10/774; G06V 10/778; G10L 25/51; G06F 18/25; G06F 18/2155; G06F 18/253; G06F 18/214
See application file for complete search history.

(56) References Cited

U.S. PATENT DOCUMENTS

| | | | | |
|---|---|---|---|---|
| 10,606,982 | B2 * | 3/2020 | Guo | G06V 20/70 |
| 11,550,782 | B2 * | 1/2023 | Dognin | G06F 16/2428 |
| 11,861,884 | B1 * | 1/2024 | Pena Pena | G06V 30/19147 |
| 2013/0108994 | A1 * | 5/2013 | Srinivasa | G06F 40/44<br>434/156 |
| 2018/0165554 | A1 * | 6/2018 | Zhang | G06F 18/214 |

(Continued)

*Primary Examiner* — Brandon S Cole
(74) *Attorney, Agent, or Firm* — HSML P.C.

(57) ABSTRACT

A method of generating a multimodal set of samples for an intelligent inspection, and a training method, which relate to a field of an artificial intelligence technology, in particular to fields of deep learning, natural language processing, speech technology, computer vision, big data and so on. The method of generating a multimodal set of samples includes: inputting an environmental sample in a collected multimodal set of environmental samples into a single-modal model matched with a modality of the environmental sample, so as to obtain a model processing result corresponding to the environmental sample; determining an initial set of samples from the multimodal set of environmental samples according to the model processing result; and processing the initial set of samples by means of an active learning, so as to determine the multimodal set of samples.

17 Claims, 6 Drawing Sheets

(56) References Cited

U.S. PATENT DOCUMENTS

| | | | | |
|---|---|---|---|---|
| 2021/0056127 | A1* | 2/2021 | Chen | G06N 3/0464 |
| 2021/0174153 | A1* | 6/2021 | Rane | G06F 18/217 |
| 2022/0237785 | A1* | 7/2022 | Mitchell | G06V 10/26 |
| 2022/0391765 | A1* | 12/2022 | Snow | G06N 20/00 |
| 2023/0245651 | A1* | 8/2023 | Wang | G06N 5/022 704/275 |

* cited by examiner

METHOD OF GENERATING MULTIMODAL SET OF SAMPLES FOR INTELLIGENT INSPECTION, AND TRAINING METHOD

This application claims priority to Chinese Patent Application No. 202210386910.2, filed on Apr. 13, 2022, the entire content of which is incorporated herein in its entirety by reference.

TECHNICAL FIELD

The present disclosure relates to a field of an artificial intelligence technology, in particular to fields of deep learning, natural language processing, speech technology, computer vision, big data and so on. Specifically, the present disclosure relates to a method of generating a multimodal set of samples for an intelligent inspection, and a training method.

BACKGROUND

Deep learning, also known as deep structured learning or hierarchical learning, is a part of a broader family of machine learning methods based on artificial neural networks. Deep learning architectures, such as deep neural networks, deep belief networks, recurrent neural networks, and convolutional neural networks, have been applied to fields including computer vision, speech recognition, natural language processing, audio recognition, social network filtering, machine translation, bioinformatics, drug design, medical image analysis, material inspection, and board game programs. In order to ensure an accuracy of output results in various fields, it is necessary to perform corresponding model training. A sample is an important data basis for model training.

SUMMARY

The present disclosure provides a method of generating a multimodal set of samples, a method of training a multimodal model, a method of processing a multimodal information, an electronic device, and a storage medium.

According to an aspect of the present disclosure, a method of generating a multimodal set of samples is provided, including: inputting an environmental sample in a collected multimodal set of environmental samples into a single-modal model matched with a modality of the environmental sample, so as to obtain a model processing result corresponding to the environmental sample; determining an initial set of samples from the multimodal set of environmental samples according to the model processing result; and processing the initial set of samples by means of an active learning, so as to determine the multimodal set of samples.

According to another aspect of the present disclosure, a method of training a multimodal model is provided, including: inputting a second target set of samples in a multimodal set of samples into a target single-modal model matched with a modality of the second target set of samples, so as to obtain a plurality of single-modal features, wherein the multimodal set of samples is determined according to the method of generating the multimodal set of samples provided by the present disclosure, the multimodal set of samples includes a plurality of second target sets of samples, each second target set of samples corresponds to a modality, and the target single-modal model is a trained single-modal model; determining a multimodal fusion feature according to the plurality of single-modal features; and training the multimodal model according to the multimodal fusion feature.

According to another aspect of the present disclosure, a method of processing a multimodal information is provided, including: inputting the multimodal information into a multimodal model to obtain a processing result, wherein the multimodal model is trained by using the method of training the multimodal model provided by the present disclosure.

According to another aspect of the present disclosure, an electronic device is provided, including: at least one processor; and a memory communicatively connected to the at least one processor, the memory stores instructions executable by the at least one processor, and the instructions, when executed by the at least one processor, are configured to cause the at least one processor to implement the method of generating the multimodal set of samples, the method of training the multimodal model and the method of processing the multimodal information provided by the present disclosure.

According to another aspect of the present disclosure, a non-transitory computer-readable storage medium having computer instructions therein is provided, and the computer instructions are configured to cause a computer system to implement the method of generating the multimodal set of samples, the method of training the multimodal model and the method of processing the multimodal information provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Figure 1:
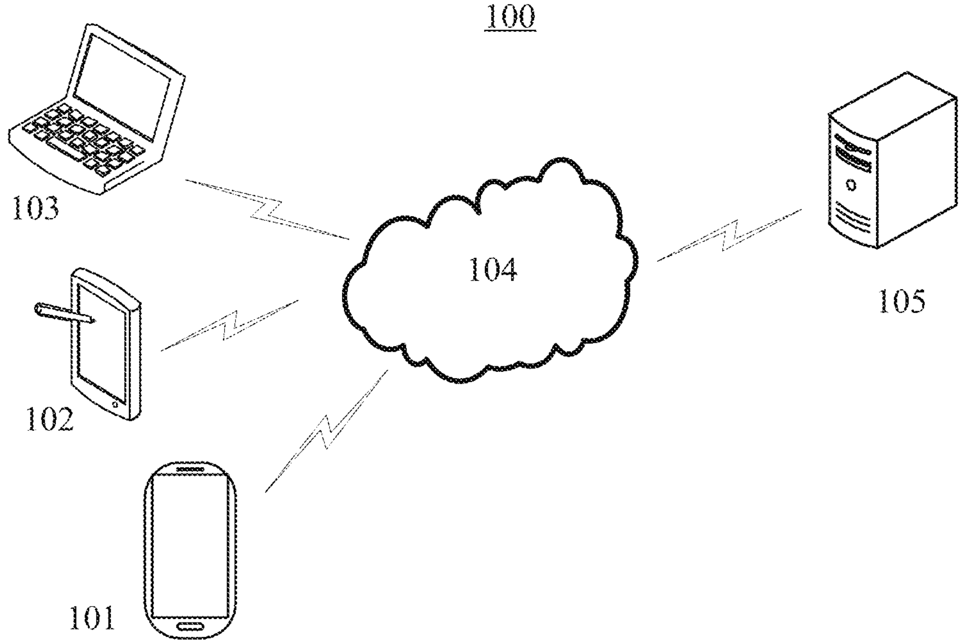
FIG. 1 schematically shows an exemplary system architecture to which a method and an apparatus of generating a multimodal set of samples, a method and an apparatus of training a multimodal model, and a method and an apparatus of processing a multimodal information may be applied according to embodiments of the present disclosure.

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In technical solutions of the present disclosure, a collection, a storage, a use, a processing, a transmission, a provision, a disclosure, an application and other processing of user personal information involved comply with provisions of relevant laws and regulations, take necessary security measures, and do not violate public order and good custom.

In the technical solutions of the present disclosure, the acquisition or collection of user personal information has been authorized or allowed by users.

An intelligent inspection is an important link in a safe production. Inspection methods may include an on-site supervision by a professional person. Due to a diversity and a complexity of production scenarios and a large randomness in a production implementation process, when a supervision is implemented by a professional person, the professional person is required to have a corresponding professional level to reduce an impact on a supervision effect. In addition, such inspection method has a cumbersome inspection process, with a high cost and a low efficiency. In an information age with data as a core, the inspection method may fail to rationally utilize an accumulation of data to improve a supervision quality, and may fail to achieve real-time monitoring and early warning.

A manual inspection method has a high cost and a low efficiency, may be easily affected by environments, and does not have a unified detection standard, while a machine vision inspection method has a poor anti-interference ability and a low accuracy, and is difficult to be optimized.

With in-depth researches of deep learning (DL) in various fields such as image recognition, machine translation and natural language processing (NLP), a deep learning-based computer vision technology may be used in a security inspection and other scenarios to automatically perform an anomaly detection and early warning. In this process, it is particularly important to train a deep learning model rationally and effectively. A process of training the deep learning model depends on an accumulation of sample data to a large extent.

The present disclosure provides a method and an apparatus of generating a multimodal set of samples, a method and an apparatus of training a multimodal model, a method and an apparatus of processing a multimodal information, an electronic device, and a storage medium. The method of generating the multimodal set of samples includes: inputting an environmental sample in a collected multimodal set of environmental samples into a single-modal model matched with a modality of the environmental sample, so as to obtain a model processing result corresponding to the environmental sample; determining an initial set of samples from the multimodal set of environmental samples according to the model processing result; and processing the initial set of samples by means of an active learning, so as to determine the multimodal set of samples.

FIG. 1 schematically shows an exemplary system architecture to which a method and an apparatus of generating a multimodal set of samples, a method and an apparatus of training a multimodal model, and a method and an apparatus of processing a multimodal information may be applied according to embodiments of the present disclosure.

It should be noted that FIG. 1 is merely an example of a system architecture to which embodiments of the present disclosure may be applied, so as to help those skilled in the art understand technical contents of the present disclosure. However, it does not mean that embodiments of the present disclosure may not be applied to other devices, systems, environments or scenarios. For example, in other embodiments, an exemplary system architecture to which the method and the apparatus of generating the multimodal set of samples, the method and the apparatus of training the multimodal model, and the method and the apparatus of processing the multimodal information may be applied may include a terminal device, but the terminal device may implement the method and the apparatus of generating the multimodal set of samples, the method and the apparatus of training the multimodal model, and the method and the apparatus of processing the multimodal information provided in embodiments of the present disclosure without interacting with a server.

As shown in FIG. 1, a system architecture 100 according to such embodiments may include terminal devices 101, 102 and 103, a network 104, and a server 105. The network 104 is used as a medium for providing a communication link between the terminal devices 101, 102, 103 and the server 105. The network 104 may include various connection types, such as wired and/or wireless communication links, and the like.

The terminal devices 101, 102 and 103 may be used by a user to interact with the server 105 through the network 104, so as to receive or send messages. The terminal devices 101, 102 and 103 may be installed with various communication client applications, such as knowledge reading applications, web browser applications, search applications, instant messaging tools, mailbox clients and/or social platform software, etc. (just for example).

The terminal devices 101, 102 and 103 may be various electronic devices having display screens and supporting web browsing, including but not limited to smartphones, tablet computers, laptop computers, desktop computers, etc.

The server 105 may be a server that provides various services, such as a background management server (just for example) that provides a support for a content browsed by the user using the terminal devices 101, 102 and 103. The background management server may analyze and process a received user request and other data, and feed back a processing result (e.g., a webpage, an information or data acquired or generated according to the user request) to the terminal devices. The server may be a cloud server, also known as a cloud computing server or a cloud host, which is a host product in a cloud computing service system to solve shortcomings of difficult management and weak service scalability existing in an existing physical host and VPS (Virtual Private Server) service. The server may also be a server of a distributed system or a server combined with a block-chain.

It should be noted that the method of generating the multimodal set of samples, the method of training the multimodal model and the method of processing the multimodal information provided by embodiments of the present disclosure may generally be performed by the server 105. Accordingly, the apparatus of generating the multimodal set of samples, the apparatus of training the multimodal model and the apparatus of processing the multimodal information provided by embodiments of the present disclosure may be generally arranged in the server 105. The method of generating the multimodal set of samples, the method of training the multimodal model and the method of processing the multimodal information provided by embodiments of the present disclosure may also be performed by a server or server cluster different from the server 105 and capable of communicating with the terminal devices 101, 102, 103 and/or the server 105. Accordingly, the apparatus of generating the multimodal set of samples, the apparatus of training the multimodal model and the apparatus of processing the multimodal information provided by embodiments of the present disclosure may also be arranged in a server or server cluster different from the server 105 and capable of communicating with the terminal devices 101, 102, 103 and/or the server 105.

Alternatively, the method of generating the multimodal set of samples, the method of training the multimodal model and the method of processing the multimodal information provided in embodiments of the present disclosure may generally be performed by the terminal device 101, 102 or 103. Accordingly, the apparatus of generating the multimodal set of samples, the apparatus of training the multimodal model and the apparatus of processing the multimodal information provided by embodiments of the present disclosure may also be arranged in the terminal device 101, 102 or 103.

For example, when determining the multimodal set of samples, the terminal devices 101, 102 and 103 may collect a multimodal set of environmental samples, and then send the collected multimodal set of environmental samples to the server 105. The server 105 may input an environmental sample in the collected multimodal set of environmental samples into a single-modal model matched with a modality of the environmental sample, so as to obtain a model processing result corresponding to the environmental sample. Then, an initial set of samples is determined from the multimodal set of environmental samples according to the model processing result, and the initial set of samples is processed by means of an active learning to determine the multimodal set of samples. Alternatively, it is possible to analyze the multimodal set of environmental samples and determine the multimodal set of samples by a server or server cluster capable of communicating with the terminal devices 101, 102, 103 and/or the server 105.

For example, when training the multimodal model, the terminal devices 101, 102 and 103 may acquire the above-mentioned multimodal set of samples, and then send the acquired multimodal set of samples to the server 105. The server 105 may input a second target set of samples in the multimodal set of samples into a target single-modal model matched with a modality of the second target set of samples, so as to obtain a plurality of single-modal features. The multimodal set of samples includes a plurality of second target sets of samples, each second target set of samples corresponds to a modality, and the target single-modal model is a trained single-modal model. Then, a multimodal fusion feature is determined according to the plurality of single-modal features, and the multimodal model is trained by using the multimodal fusion feature. Alternatively, it is possible to analyze the multimodal set of samples and train the multimodal model by a server or server cluster capable of communicating with the terminal devices 101, 102, 103 and/or the server 105.

For example, when processing the multimodal information, the terminal devices 101, 102 and 103 may acquire the multimodal information, and then send the acquired multimodal information to the server 105. The server 105 may input the multimodal information into a multimodal model to obtain a processing result. The multimodal model is trained by using the above-mentioned training method. Alternatively, it is possible to process the multimodal information and obtain the processing result by a server or server cluster capable of communicating with the terminal devices 101, 102, 103 and/or the server 105.

It should be understood that the numbers of terminal devices, networks and servers shown in FIG. 1 are merely schematic. According to the implementation needs, any numbers of terminal devices, networks and servers may be provided.

In an actual industrial process, due to a diversity of production requirements and application scenarios, a plurality of operation modalities may exist in the production process. The operation modalities may implement different functions in different stages and different scenarios. In view of this, it is possible to acquire information from multiple dimensions, such as an image information, an audio information, a video information, and so on, and construct a multimodal set of samples, so that a deep learning model trained based on the multimodal set of samples may be comprehensively and efficiently applied to various scenarios.

Figure 2:
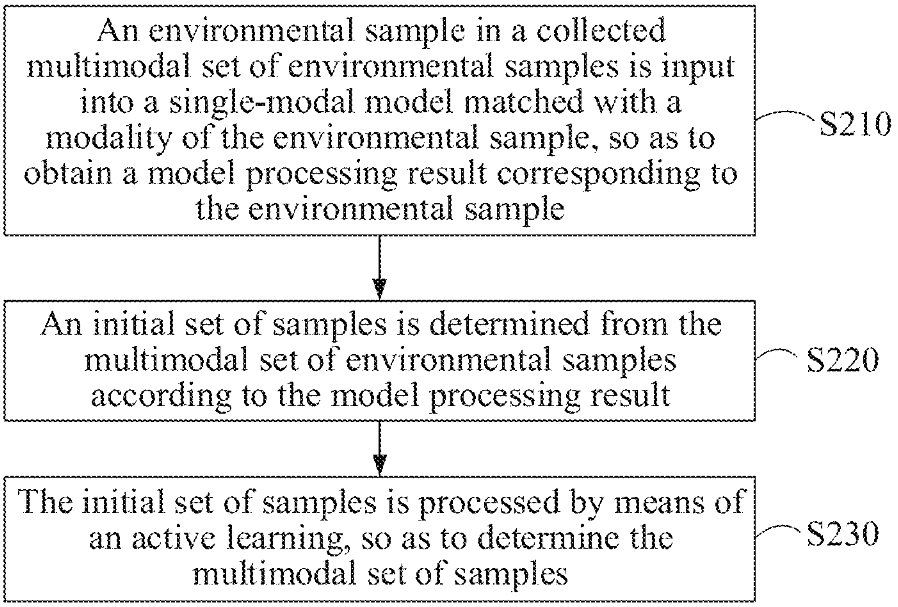
FIG. 2 schematically shows a flowchart of a method of generating a multimodal set of samples according to embodiments of the present disclosure.

FIG. 2 schematically shows a flowchart of a method of generating a multimodal set of samples according to embodiments of the present disclosure.

As shown in FIG. 2, the method includes operation S210 to operation S230.

In operation S210, an environmental sample in a collected multimodal set of environmental samples is input into a single-modal model matched with a modality of the environmental sample, so as to obtain a model processing result corresponding to the environmental sample.

In operation S220, an initial set of samples is determined from the multimodal set of environmental samples according to the model processing result.

In operation S230, the initial set of samples is processed by means of an active learning, so as to determine the multimodal set of samples.

According to embodiments of the present disclosure, an environment for providing environmental samples may include an environment in which various modalities blend with each other. According to different feature dimensions, various modalities may include but not be limited to at least one selected from: an audio modality, an image modality, a video modality, a text modality, or the like. The multimodal set of environmental samples may contain environmental samples collected from various environments in which modalities may blend with each other. For example, the multimodal set of environmental samples may contain a combination of at least two selected from an audio modal environmental sample, an image modal environmental sample, a video modal environmental sample, and/or a text modal environmental sample, etc.

According to embodiments of the present disclosure, for different feature dimensions, the single-modal model may include but not be limited to, for example, at least one selected from: a model for processing an audio-type information, a model for processing an image-type information, a model for processing a video-type information, or a model for processing a text-type information, etc. The image-type information may include, for example, at least one selected from a visible light image or a heat map image, etc. The model for processing the audio-type information may be implemented based on, for example, MFCC (Mel-Frequency Cepstral Coefficients). The single-modal model may be used to achieve at least one function selected from an object detection, an object recognition, or an object classification, etc.

According to embodiments of the present disclosure, after the multimodal set of environmental samples is collected, the environmental sample in the collected multimodal set of environmental samples may be input into a single-modal model corresponding to the modality of the environmental sample, and may be processed to obtain a corresponding model processing result. For example, a collected audio modal environmental sample may be input into an audio detection model for processing the audio-type information, and may be processed to obtain an audio detection result. A collected image modal environmental sample may be input into an image classification model for processing the image-type information, and may be processed to obtain an image classification result. The model processing result may be determined according to the function of the model and the information input into the model, and is not limited to those listed above.

According to embodiments of the present disclosure, the initial set of samples may be a set of samples selected from the multimodal set of environmental samples, where the model processing results for the set of samples meet a predetermined condition. The predetermined condition may include, for example, at least one selected from: the model processing results being different, a confidence of the model processing result being within a predefined range, and/or other predetermined conditions. For example, the model processing results being different may be represented by at least one form selected from: categories of objects being different, and/or object detection results being different, etc.

According to embodiments of the present disclosure, the active learning may include at least one selected from: Uncertainty Sampling, Query-By-Committee (QBC), Expected Model Change, Expected Error Reduction, Variance Reduction, or other query strategies. The active learning is a method of actively selecting a valuable sample. By processing the initial set of samples by means of the active learning, a high-quality sample that may achieve an optimal effect on the model training may be queried from the initial set of samples. The multimodal set of samples may be a set of such high-quality samples.

Through the above-mentioned embodiments of the present disclosure, the environmental samples used to train the model may be acquired based on a plurality of modalities. Combining two stages of model processing and active learning, a multimodal set of samples that may achieve a good effect on the model training may be obtained to implement the training of the model. It is especially suitable for scenarios where abnormal data are generally sparse. Based on this method, high-quality multimodal samples may be obtained easily, so that an efficiency of the model training may be improved effectively. The model trained based on the multimodal samples may have a higher accuracy and robust, and may be applied to more categories of scenarios.

The method shown in FIG. 2 will be further described below in conjunction with specific embodiments.

According to embodiments of the present disclosure, the model processing result may include a confidence information corresponding to the model processing result. Determining the initial set of samples from the multimodal set of environmental samples according to the model processing result may include: determining the initial set of samples from the multimodal set of environmental samples according to the confidence information.

According to embodiments of the present disclosure, the confidence information may indicate a reliability level of the model processing result. For example, a result of processing an information to be detected by an object detection model may include a detected object information and a confidence information indicating a possibility of an existence of the object information. A result of processing an image to be classified by an image classification model may include an image category of the image to be classified and a confidence information indicating a probability that the image to be classified belongs to that category.

According to embodiments of the present disclosure, an environmental sample corresponding to a first target confidence information within a predefined range may be determined as a sample in the initial set of samples. It is also possible to determine a plurality of environmental samples corresponding to a same modality; then determine, from the confidence information in the plurality of model processing results corresponding to the plurality of environmental samples, a second target confidence information whose different value is greater than a target predetermined threshold; and determine the environmental sample corresponding to the second target confidence information as a sample in the initial set of samples. The second target confidence information may be the same as or different from the first target confidence information.

It should be noted that the above-mentioned method of determining the sample in the initial set of samples is merely an exemplary embodiment. However, the present disclosure is not limited thereto, and may further include other sample query methods known in the art, as long as a high-quality sample that may achieve a good effect on the model training may be queried.

Through the above-mentioned embodiments of the present disclosure, an initial selection of the samples in the collected multimodal set of environmental samples may be performed in combination with the confidence information, so that the samples less helpful to the model training may be filtered out, and more valid samples may be selected.

According to embodiments of the present disclosure, determining the initial set of samples from the multimodal set of environmental samples according to the confidence information may include: determining a first target set of environmental samples corresponding to the confidence information greater than a first predetermined threshold; determining a second target set of environmental samples corresponding to the confidence information less than a second predetermined threshold; and determining the initial set of samples according to the first target set of environmental samples and the second target set of environmental samples. The second predetermined threshold is less than the first predetermined threshold.

According to embodiments of the present disclosure, a dual-threshold strategy may be adopted, for example, a high threshold and a low threshold may be set to perform a selection on the collected multimodal set of environmental samples to obtain the initial set of samples. The high threshold may be, for example, the first predetermined threshold, and the low threshold may be, for example, the second predetermined threshold. A predefined range may be determined by the predetermined threshold. For example, the predefined range may include at least one selected from a range higher than the first predetermined threshold or a range lower than the second predetermined threshold, etc. A third target confidence information used to determine a sample in the initial set of samples may be determined according to the predefined range, so as to determine the initial set of samples. The high threshold may be used for an online operation to improve an accuracy of the model processing result, increase a detection rate, and reduce false positives. The corresponding sample may be used as, for example, a positive sample. The low threshold may be used to collect data with defects, and may also collect suspected abnormal data. The corresponding sample may be used as, for example, a negative sample. The data with defects and the suspected abnormal data may include, for example, data with a low accuracy of model processing result, which may include but not be limited to, for example, at least one selected from misidentified data or misclassified data, etc. Both the positive sample and the negative sample may be used as samples in the initial set of samples for a subsequent iteration of the model.

According to embodiments of the present disclosure, the above-mentioned process of obtaining the initial set of samples may be implemented by, for example, providing a data return module. For example, a dual-threshold strategy may be provided in the data return module to process the samples in the collected multimodal set of environmental samples, so as to achieve an accumulation of the initial set of samples.

Through the above-mentioned embodiments of the present disclosure, an initial set of samples that is more conducive to the model training may be obtained, which is especially suitable for an extraction of samples from a multimodal set of massive environmental samples with a small amount of abnormal data, so that a labor cost and time cost in a case of a manual selection may be reduced, and a quality of the initially obtained initial set of samples may be effectively improved.

According to embodiments of the present disclosure, the initial set of samples obtained by the data return module contains few environmental samples with obvious abnormalities, and most of the environmental samples are difficult to be distinguished and need to be labeled. Labeling of data has different requirements in different scenarios, most of which require a participation of professionals, still with a high cost.

According to embodiments of the present disclosure, the obtained initial set of samples may be further processed by means of an active learning to determine a multimodal set of samples. The active learning may include but not be limited to at least one selected from: Uncertainty Sampling, Query-By-Committee, or Expected Model Change.

According to embodiments of the present disclosure, Uncertainty Sampling may be implemented to extract, based on a single model, environmental samples that are difficult to be distinguished by the single model, from the initial set of samples as the multimodal set of samples, so as to reach an ability of improving an effect of an algorithm at a high speed.

According to embodiments of the present disclosure, Query-By-Committee may be implemented to process the initial set of samples based on a plurality of models, then by voting on the environmental samples in the initial set of samples in combination with the model processing results of the plurality of models, select the environmental samples that are difficult to be distinguished by more models in the initial set of samples as the multimodal set of samples.

According to embodiments of the present disclosure, the environmental samples that are difficult to be distinguished may include, for example, an environmental sample corresponding to a model processing result having a confidence in a range of, for example, 0.4 to 0.6. The sample difficult to be distinguished may be determined according to the confidence information of the model processing result and a predefined confidence range for indicating that a corresponding sample is difficult to be distinguished.

It should be noted that a limitation for the range of 0.4 to 0.6 may be customized according to the application scenario, and the present disclosure is not limited thereto.

According to embodiments of the present disclosure, Expected Model Change may be implemented so that environmental samples with which a model gradient change is greater than a predetermined value may be selected, based on a single model or a plurality of models, from the initial set of samples as the multimodal set of samples.

According to embodiments of the present disclosure, for example, comparative experiments may be performed on the above-mentioned query strategies, such as Uncertainty Sampling, Query-By-Committee and Expected Model Change, by using a small amount of data. Then, an appropriate query strategy may be selected and put into the above-mentioned active learning process.

Through the above-mentioned embodiments of the present disclosure, a smaller amount of high-quality environmental samples may be selected from the initially obtained initial set of samples by means of the active learning. The obtained smaller amount of high-quality environmental samples may effectively save a cost of manual labeling and improve an effect of the model training.

According to embodiments of the present disclosure, processing the initial set of samples by means of the active learning to determine the multimodal set of samples may include: determining a first target set of samples obtained by processing the initial set of samples by means of the active learning; and determining the first target set of samples as the multimodal set of samples.

According to embodiments of the present disclosure, the first target set of samples may include a sample selected from the initial set of samples, where the sample is relatively helpful to the model training. After the first target set of samples is obtained, the first target set of samples may be used as the multimodal set of samples for training the model, without labeling the sample in the first target set of samples.

It should be noted that, in some scenarios, it is also possible to label the samples in the obtained first target set of samples, and then determine the first target set of labeled samples as the multimodal set of samples for training the model.

Through the above-mentioned embodiments of the present disclosure, a multimodal set of high-quality samples may be determined directly from the initial set of samples by means of the active learning, so that a time length for determining high-quality samples may be saved, and a problem of high costs for labeling massive samples may be effectively alleviated.

According to embodiments of the present disclosure, the active learning may include a first active learning and a second active learning. Processing the initial set of samples by means of the active learning to determine the multimodal set of samples may include: processing the initial set of samples by means of the first active learning to obtain an intermediate set of samples; performing at least one round of processing on the intermediate set of samples by means of the second active learning to obtain an intermediate subset of samples corresponding to the round; and determining the multimodal set of samples according to the intermediate subset of samples.

According to embodiments of the present disclosure, the strategy of the first active learning and the strategy of the second active learning may be selected from the above-mentioned strategies included in the active learning. The strategy of the first active learning may be the same as or different from the strategy of the second active learning.

According to embodiments of the present disclosure, the intermediate set of samples obtained by processing the initial set of samples by means of the active learning may be further processed by means of the active learning. The multimodal set of samples may be determined according to the samples obtained by processing the intermediate set of samples by means of the active learning, that is, according to the intermediate subset of samples.

According to embodiments of the present disclosure, after the intermediate subset of samples is determined, the intermediate subset of unlabeled samples may be determined as the multimodal set of samples. It is also possible to label the samples in the intermediate subset of samples, and then determine the intermediate subset of labeled samples as the multimodal set of samples, which is not limited here.

Through the above-mentioned embodiments of the present disclosure, a smaller amount of high-quality samples more helpful to the model training may be selected from the initial set of samples by means of the first active learning and the second active learning, so that the labeling cost may be effectively reduced, the time length for determining samples may be reduced, and the accuracy of the model training may be ensured.

According to embodiments of the present disclosure, determining the multimodal set of samples according to the intermediate subset of samples may include: determining the intermediate subset of labeled samples and a first subset of other samples as the multimodal set of samples. The first subset of other samples is a set of other samples in the intermediate set of samples other than the intermediate subset of samples.

According to embodiments of the present disclosure, after the intermediate subset of samples is determined, the samples in the intermediate subset of samples may be labeled. Then, the intermediate subset of labeled samples and the first subset of unlabeled other samples in the intermediate set of samples may be determined as the multimodal set of samples.

Through the above-mentioned embodiments of the present disclosure, the intermediate subset containing a small amount of labeled samples selected by the active learning and the first subset containing a large amount of unlabeled other samples in the intermediate set of samples are combined for the model training, which may effectively improve an ability of the model and improve an effect of the model.

According to embodiments of the present disclosure, determining the multimodal set of samples according to the intermediate subset of samples may include: determining the intermediate subset of labeled samples as the multimodal set of samples.

According to embodiments of the present disclosure, after the intermediate subset of samples is determined, the samples in the intermediate subset of samples may be labeled. Then, the intermediate subset of labeled samples may be determined as the multimodal set of samples.

Through the above-mentioned embodiments of the present disclosure, as the intermediate subset of samples contain high-quality samples selected from the initial set of samples by means of the first active learning and the second active learning, which have a relatively small amount of data and a relatively large help for the model training, the labeling cost may be effectively reduced when obtaining the intermediate subset of labeled samples, and the model trained based on the intermediate subset of labeled samples may have a high accuracy.

According to embodiments of the present disclosure, the at least one round may include a first round to an $M^{th}$ round, where M is a positive integer. Performing at least one round of processing on the intermediate set of samples by means of the second active learning to obtain the intermediate subset of samples corresponding to the round may include: processing, in the first round, the intermediate set of samples by means of the second active learning to obtain an intermediate subset of samples corresponding to the first round; and processing, in an $m^{th}$ round, a second subset of other samples by means of the second active learning to obtain an intermediate subset of samples corresponding to the $m^{th}$ round. The second subset of other samples is a set of other samples in the intermediate set of samples other than the intermediate subsets of samples corresponding to first $m-1$ rounds, where m is greater than 1 and less than or equal to M, and m is a positive integer.

According to embodiments of the present disclosure, after the intermediate subset of samples corresponding to the first round is obtained, it is possible to manually label the samples therein, and the intermediate subset of labeled samples may be determined as the multimodal set of samples corresponding to the first round. After the multimodal set of samples corresponding to the first round is determined, the corresponding model may be trained by using the samples in the multimodal set of samples corresponding to the first round to improve the effect of the model. Then, a second round of processing may be performed on the second set of other samples in the intermediate set of samples. This process may include determining an intermediate subset of samples corresponding to the second round from the second set of other samples by means of the active learning, then labeling the samples therein, and determining the multimodal set of samples corresponding to the second round. The model trained by using the samples in the multimodal set of samples determined by the first round may be further trained by using the samples in the multimodal set of samples determined by the second round, so as to further improve the effect of the model. By analogy, after the corresponding model is trained by using the samples in the multimodal set of samples determined by an $(m-1)^{th}$ round, the multimodal set of samples corresponding to the $m^{th}$ round may be determined from the remaining samples in the intermediate set of samples, and the corresponding model trained by using the samples in the multimodal set of samples determined by the $(m-1)^{th}$ round may be further trained by using the samples in the multimodal set of samples determined by the $m^{th}$ round. This process may be ended after all samples in the intermediate set of samples are determined as samples in the multimodal set of samples.

Through the above-mentioned embodiments of the present disclosure, after a determination of an intermediate subset of samples corresponding to each round, a probability that a relatively more important sample is selected from the second subset of other samples in the intermediate set of samples may be increased in a subsequent round. By multiple rounds of selection, the initial set of samples may be divided into a batch of subsets of samples, and the corresponding model may be trained successively by using the samples in the batch of subsets of samples, so that the iteration of the model is more efficient, and the training effect of the model may be further improved.

According to embodiments of the present disclosure, after a multimodal set containing a small amount of high-quality samples is obtained, a multimodal model may be trained in combination with a semi-supervised learning method and an unsupervised learning method, so as to achieve a unified deployment of desired models in various scenarios. The unsupervised learning may be used to train the model to detect a valid result without labeling data.

Figure 3:
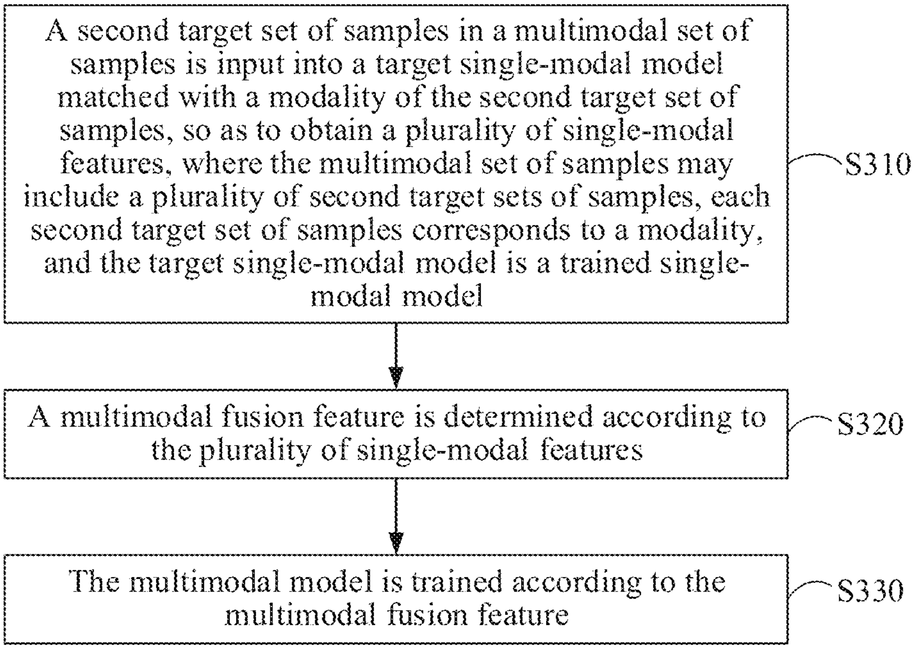
FIG. 3 schematically shows a flowchart of a method of training a multimodal model according to embodiments of the present disclosure.

FIG. 3 schematically shows a flowchart of a method of training a multimodal model according to embodiments of the present disclosure.

As shown in FIG. 3, the method includes operation S310 to operation S330.

In operation S310, a second target set of samples in a multimodal set of samples is input into a target single-modal model matched with a modality of the second target set of samples, so as to obtain a plurality of single-modal features. The multimodal set of samples may include a plurality of second target sets of samples, and each second target set of samples corresponds to a modality. The target single-modal model is a trained single-modal model.

In operation S320, a multimodal fusion feature is determined according to the plurality of single-modal features.

In operation S330, the multimodal model is trained according to the multimodal fusion feature.

According to embodiments of the present disclosure, the multimodal set of samples in operation S310 may be determined according to the above-mentioned method of generating the multimodal set of samples.

According to embodiments of the present disclosure, in a case that the collected multimodal set of environmental samples for determining the multimodal set of samples contains an audio modal environmental sample, an image modal environmental sample, a video modal environmental sample, a text modal environmental sample, and so on, the second target set of samples may contain any one of a target audio modal environmental sample, a target image modal environmental sample, a target video modal environmental sample, or a target text modal environmental sample, etc., determined from the multimodal set of environmental samples by means of an initial selection and an active learning.

According to embodiments of the present disclosure, the target single-modal model may be a model trained by using corresponding modal samples. For example, the target single-modal model may be any one of a model for processing an audio-type information that is trained by using audio-type samples, a model for processing an image-type information that is trained by using image-type samples, a model for processing a video-type information that is trained by using video-type samples, or a model for processing a text-type information that is trained by using text-type samples, etc., as long as the modality of the target single-modal model is matched with the modality of the second target set of samples.

According to embodiments of the present disclosure, the multimodal fusion feature may represent a feature of the multimodal set of samples. Single-modal features at a same time instant or within a same time period may be fused to obtain the multimodal fusion feature.

According to embodiments of the present disclosure, after the multimodal fusion feature is obtained, the multimodal fusion feature may be mapped into a corresponding multimodal model processing result in combination with a task module. In a case that the multimodal fusion feature contains an audio-related feature and an image-related feature, the multimodal model processing result may include, for example, at least one selected from an audio recognition result or an image recognition result. The multimodal model may be trained in combination with the multimodal model processing result.

According to embodiments of the present disclosure, in a case that it is determined that the multimodal set of samples is determined according to unlabeled environmental samples, the multimodal model may be trained in combination with the multimodal model processing result based on the unsupervised learning method.

For example, after the multimodal set of samples is input into the multimodal model, a strong data augmentation and a weak data augmentation may be performed on a same unlabeled sample in the multimodal set of samples, so as to obtain a strongly processed multimodal set of samples and a weakly processed multimodal set of samples, respectively. Then, an unlabeled sample in the weakly processed multimodal set of samples may be input into a target single-modal model matched with a modality of the unlabeled sample to obtain a corresponding single-modal feature. After a single-modal feature corresponding to each unlabeled sample in the weakly processed multimodal set of samples is obtained, a multimodal fusion feature corresponding to the weakly processed multimodal set of samples may be obtained by a feature fusion, and a multimodal model processing result may be determined. According to the multimodal model processing result corresponding to the weakly processed multimodal set of samples, for example, it is possible to determine a pseudo label corresponding to the unlabeled sample in each modality in the multimodal set of samples. The pseudo label may be used as a labeling information for the corresponding unlabeled sample in the strongly processed multimodal set of samples. The process for the weakly processed multimodal set of samples may also be performed on the strongly processed multimodal set of samples labeled with the pseudo label, and a multimodal model processing result corresponding to the strongly processed multimodal set of samples may be obtained. The multimodal model may be trained based on the unsupervised learning according to the multimodal model processing result corresponding to the weakly processed multimodal set of samples and the multimodal model processing result corresponding to the strongly processed multimodal set of samples.

It should be noted that the pseudo label may include, for example, at least one selected from: a label indicating a category of an object in the image, a label indicating a size and a position of an object detection box for an object in the image, or a label indicating a sound anomaly in the audio, etc., which is not limited here.

In a case that it is determined that the multimodal set of samples is determined according to a small amount of labeled environmental samples and a large amount of unlabeled environmental samples, the multimodal model may be trained in combination with the multimodal model processing result based on the semi-supervised learning method.

For example, the aforementioned unsupervised learning process may be performed on the multimodal model for the unlabeled environmental samples in the multimodal set of samples. The aforementioned process for the weakly processed multimodal set of samples and the strongly processed multimodal set of samples may be performed for the labeled environmental samples in the multimodal set of samples. Based on this, the multimodal model may be trained based on the semi-supervised learning.

Through the above-mentioned embodiments of the present disclosure, a complementary of various heterogeneous information, that is, a multimodal fusion may be achieved by a conversion and a fusion of the information in the multimodal set of samples. By training the multimodal model in combination with the multimodal fusion feature obtained by fusion, the multimodal model may be endowed with an ability to learn and fuse multimodal information. The trained multimodal model may be reused in various scenarios, with easy iteration and stronger adaptability, and may obtain a more accurate multimodal model processing result.

According to embodiments of the present disclosure, before the second target set of samples in the multimodal set of samples is input into the target single-modal model matched with the modality of the second target set of samples, the corresponding target single-modal model may be trained by using the second target set of samples in the multimodal set of samples. For example, the process may include: determining N deep learning models, where N is a positive integer; and training the N deep learning models by using N target sets of samples corresponding to N modalities respectively, so as to obtain the target single-modal model.

According to embodiments of the present disclosure, the information that may be generated in the environment may be classified according to different modalities, and the number of modalities used for classification is determined. Then, an untrained or pre-trained deep learning model may be determined for each category of modality, that is, it is possible to determine the number of deep learning models same as the number of modalities used for classification, for example, it is possible to determine N deep learning models. Then, each deep learning model may be trained by using a second target set of samples in the multimodal set of samples, so as to obtain a trained target single-modal model matched with a modality of the second target set of samples. Different deep learning models are trained by using different second target sets of samples.

According to embodiments of the present disclosure, the second target set of samples may contain unlabeled samples or contain some labeled samples. The method of training each deep learning model based on the second target set of samples may include an unsupervised learning method or a semi-supervised learning.

Through the above-mentioned embodiments of the present disclosure, the target single-modal model in the multimodal model is trained by using a multimodal set containing a small amount of high-quality samples obtained by means of the active learning, which may effectively reduce a cost of labeling a sample and help to implement the deployment of the multimodal model. In addition, when the target single-modal model trained based on the second target set of samples in the multimodal set of samples is applied to the multimodal model, the target single-modal model may extract single-modal features of the corresponding second target set of samples in the multimodal set of samples to a maximum extent. By training the multimodal model based on the multimodal fusion feature obtained by a fusion of the single-modal features, the training effect of the multimodal model may be maximized, and a more accurate multimodal model detection result may be obtained.

According to embodiments of the present disclosure, determining the multimodal fusion feature according to the plurality of single-modal features may include: determining, for a single-modal feature among the plurality of single-modal features, a weight corresponding to the single-modal feature according to a proportion of the single-modal feature in the plurality of single-modal features; and determining the multimodal fusion feature according to the plurality of single-modal features and the weights corresponding to the single-modal features.

According to embodiments of the present disclosure, after the plurality of single-modal features are obtained, in a process of fusing the plurality of single-modal features, a weight corresponding to each single-modal feature may be learned by calculating a proportion of each single-modal feature in a same time dimension in the plurality of single-modal features based on an attention mechanism.

Through the above-mentioned embodiments of the present disclosure, the multimodal fusion feature determined in combination with a plurality of single-modal features and the weights corresponding to the single-modal features may have a more accurate feature representation result. By training the multimodal model based on the more accurate feature representation result, the multimodal model may learn to automatically select one or more suitable modal features for detection in different scenarios, which may effectively improve a generalization ability and a robustness of the model, and further improve the training effect of the multimodal model.

Figure 4:
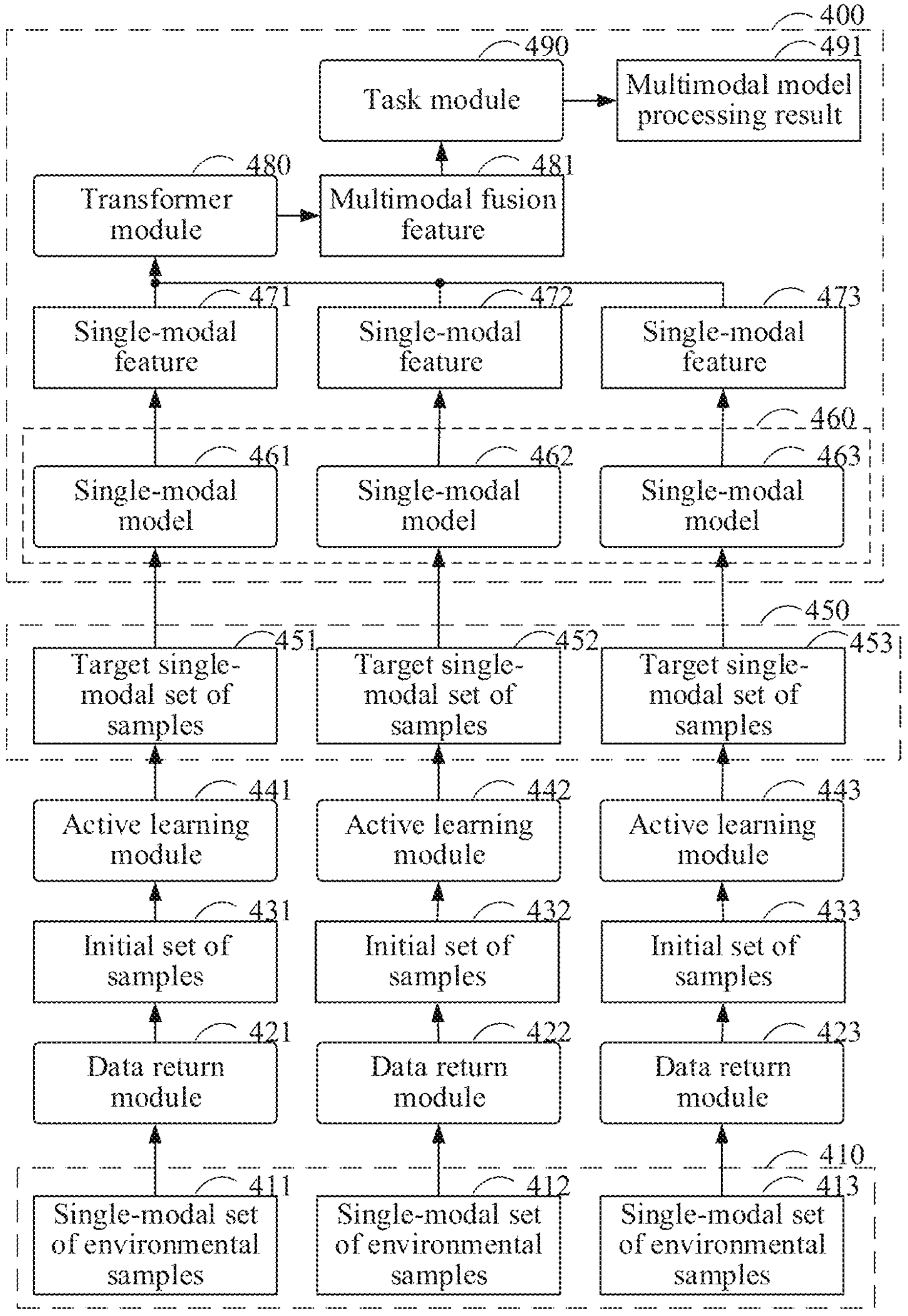
FIG. 4 schematically shows a schematic diagram of collecting high-quality environmental samples to train a multimodal model according to embodiments of the present disclosure.

FIG. 4 schematically shows a schematic diagram of collecting high-quality environmental samples to train a multimodal model according to embodiments of the present disclosure.

According to embodiments of the present disclosure, for example, various modal information may be generated in an environment to be detected. When collecting environmental data, each modal information may be collected separately. Then, a multimodal set of samples may be obtained by selecting and summarizing the collected various modal information.

As shown in FIG. 4, an information collection is performed on the environment to be detected, and for example, a multimodal set of environmental samples 410 may be collected. The multimodal set of environmental samples 410 may include single-modal sets of environmental samples 411, 412 and 413 respectively collected for various modal information in the environment to be detected. The single-modal sets of environmental samples 411, 412 and 413 may correspond to, for example, a set of image modal samples, a set of audio modal samples, and a set of text modal samples, respectively.

The single-modal sets of environmental samples 411, 412 and 413 may be respectively provided with data return modules 421, 422 and 423 used to select samples. The data return modules 421, 422 and 423 may be pre-provided with a dual-threshold strategy, so that initial sets of samples 431, 432 and 433 may be selected from the single-modal sets of environmental samples 411, 412 and 413, respectively. For example, after the single-modal set of environmental samples 411 is input into the data return module 421, the initial set of samples 431 corresponding to the single-modal set of environmental samples 411 may be obtained.

The initial sets of samples 431, 432 and 433 may be respectively provided with active learning modules 441, 442 and 443 used to further select samples, so that target single-modal sets of samples 451, 452 and 453 may be selected from the initial sets of samples 431, 432 and 433, respectively, and the target single-modal sets of samples 451, 452 and 453 in respective modal sets of samples are relatively more helpful to the model training. For example, after the initial set of samples 431 is input into the active learning module 441, the target single-modal set of samples 451 may be obtained. By summarizing the target single-modal sets of samples 451, 452 and 453, a multimodal set of samples 450 containing a small amount of high-quality samples may be obtained to train the multimodal model. A target single-modal set of samples in each modality may correspond to the second target set of samples described above.

According to embodiments of the present disclosure, the multimodal model may include a single-modal information processing module and an attention mechanism-based Transformer module. The single-modal information processing module may include a plurality of single-modal models, and each single-modal model may process a target single-modal set of samples in the corresponding modality. The Transformer module may perform the training of the multimodal model. A process of training the multimodal model may include training each single-modal model in the multimodal model, training the Transformer module, and the like.

As shown in FIG. 4, a multimodal model 400 includes a single-modal information processing module 460 and a Transformer module 480. The single-modal information processing module 460 may include single-modal models 461, 462, 463 and so on. After the multimodal set of samples 450 is obtained, single-modal models 461, 462 and 463 may be trained respectively by using the target single-modal sets of samples 451, 452 and 453 in the multimodal set of samples 450. After a completion of the training of the single-modal models 461, 462 and 463, the target single-modal sets of samples 451, 452 and 453 in the multimodal set of samples 450 may be respectively input into the single-modal models 461, 462 and 463 matched with the modalities of the target single-modal sets of samples 451, 452 and 453, and corresponding single-modal features 471, 472 and 473 may be obtained. Then, the single-modal features 471, 472 and 473 may be input into the Transformer module 480 to obtain a multimodal fusion feature 481. A task module 490 may process the multimodal fusion feature 481 to obtain a corresponding multimodal model processing result 491. Combined with the multimodal model processing result 491, a training parameter of the Transformer module may be adjusted to achieve the training of the multimodal model.

It should be noted that the number of single-modal sets of environmental samples described above may be determined according to the number of categories of modalities in the environment, and the number of data return modules, active learning modules and single-modal models may be determined according to the number of single-modal sets of environmental samples, which are not limited to the three types shown in FIG. 4.

Through the above-mentioned embodiments of the present disclosure, a set of solutions based on a multimodal fusion is proposed, which solves problems of low efficiency and poor accuracy of single-modal model, and may also make up for a poor versatility of information processing using only single-modal model. In addition, for the general shortage of abnormal data in industrial scenes, a solution of training a high-accuracy model by using a small amount of data is proposed, which improves the training effect and robustness of the model.

Figure 5:
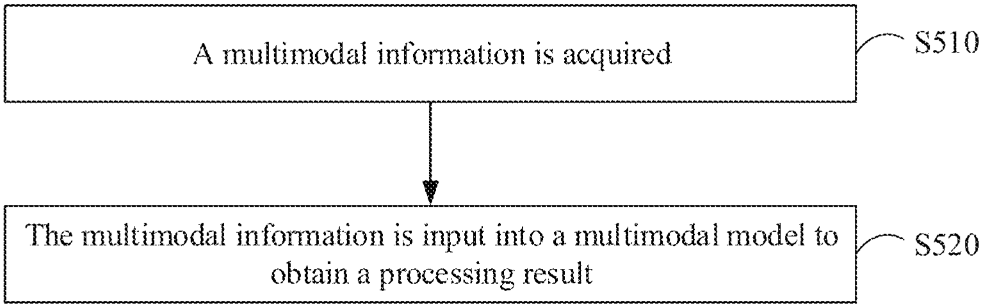
FIG. 5 schematically shows a flowchart of a method of processing a multimodal information according to embodiments of the present disclosure.

FIG. 5 schematically shows a flowchart of a method of processing a multimodal information according to embodiments of the present disclosure.

As shown in FIG. 5, the method includes operation S510 to operation S520.

In operation S510, a multimodal information is acquired.

In operation S520, the multimodal information is input into a multimodal model to obtain a processing result.

According to embodiments of the present disclosure, the multimodal model in operation S520 may be trained by using the aforementioned method of training the multimodal model. The multimodal model may process different modal information in a same time dimension in parallel.

For example, for a service scenario of industrial inspection, it is possible to collect multimodal information, such as a visible light image, an infrared thermal image, and an audio information. Then, a multimodal fusion and processing may be performed on features of the visible light image, the infrared thermal image and the audio information based on the multimodal model, so as to recognize abnormalities in the scene from multiple dimensions and give timely warning, thereby reducing a risk of potential accidents.

Through the above-mentioned embodiments of the present disclosure, a deep learning-based multimodal fusion solution is proposed, which may recognize and early warn potential dangerous information in the environment through multimodal information such as visible light image, infrared thermal image, audio, and so on, so as to save losses to a maximum extent and prevent possible troubles. In addition, a variety of potentially dangerous situations may be recognized more comprehensively through high-accuracy image detection and segmentation algorithms in combination with an assistance of sound features.

Figure 6:
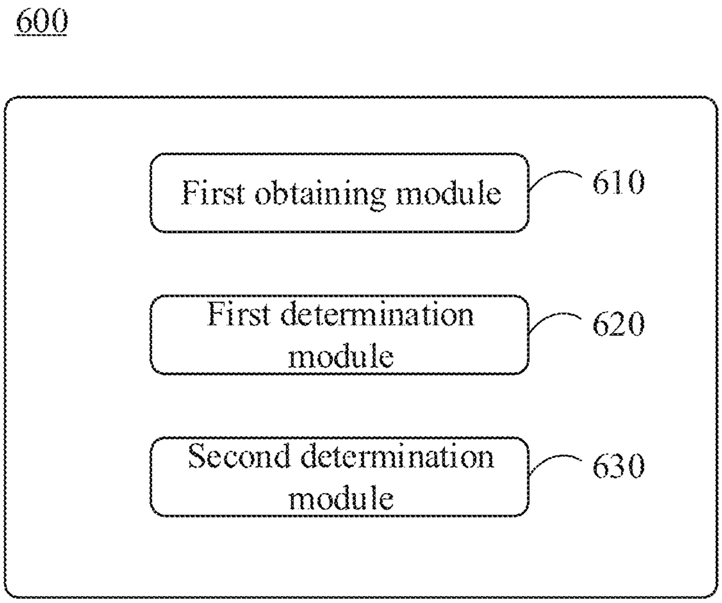
FIG. 6 schematically shows a block diagram of an apparatus of generating a multimodal set of samples according to embodiments of the present disclosure.

FIG. 6 schematically shows a block diagram of an apparatus of generating a multimodal set of samples according to embodiments of the present disclosure.

As shown in FIG. 6, an apparatus 600 of generating a multimodal set of samples includes a first obtaining module 610, a first determination module 620, and a second determination module 630.

The first obtaining module 610 may be used to input an environmental sample in a collected multimodal set of environmental samples into a single-modal model matched with a modality of the environmental sample, so as to obtain a model processing result corresponding to the environmental sample.

The first determination module 620 may be used to determine an initial set of samples from the multimodal set of environmental samples according to the model processing result.

The second determination module 630 may be used to process the initial set of samples by means of an active learning, so as to determine the multimodal set of samples.

According to embodiments of the present disclosure, the active learning includes a first active learning and a second active learning. The second determination module includes a first obtaining unit, a second obtaining unit, and a first determination unit.

The first obtaining unit may be used to process the initial set of samples by means of the first active learning, so as to obtain an intermediate set of samples.

The second obtaining unit may be used to perform at least one round of processing on the intermediate set of samples by means of the second active learning, so as to obtain an intermediate subset of samples corresponding to the round.

The first determination unit may be used to determine the multimodal set of samples according to the intermediate subset of samples.

According to embodiments of the present disclosure, the first determination unit includes a first determination subunit.

The first determination sub-unit may be used to determine an intermediate subset of labeled samples and a first subset of other samples as the multimodal set of samples. The first subset of other samples is a set of other samples in the intermediate set of samples other than the intermediate subset of samples.

According to embodiments of the present disclosure, the first determination unit includes a second determination sub-unit.

The second determination sub-unit may be used to determine the intermediate subset of labeled samples as the multimodal set of samples.

According to embodiments of the present disclosure, the at least one round includes a first round to an $M^{th}$ round, and M is a positive integer. The second obtaining unit includes a first obtaining sub-unit and a second obtaining sub-unit.

The first obtaining sub-unit may be used to process, in the first round, the intermediate set of samples by means of the second active learning, so as to obtain an intermediate subset of samples corresponding to the first round.

The second obtaining sub-unit may be used to process, in an $m^{th}$ round, a second subset of other samples by means of the second active learning, so as to obtain an intermediate subset of samples corresponding to the $m^{th}$ round. The second subset of other samples is a set of other samples in the intermediate set of samples other than the intermediate subsets of samples corresponding to first $m-1$ rounds, m is greater than 1 and less than or equal to M, and m is a positive integer.

According to embodiments of the present disclosure, the second determination module includes a second determination unit and a third determination unit.

The second determination unit may be used to determine a first target set of samples. The first target set of samples is obtained by processing the initial set of samples by means of the active learning.

The third determination unit may be used to determine the first target set of samples as the multimodal set of samples.

According to embodiments of the present disclosure, the model processing result includes a confidence information corresponding to the model processing result. The first determination module includes a fourth determination unit.

The fourth determination unit may be used to determine the initial set of samples from the multimodal set of environmental samples according to the confidence information.

According to embodiments of the present disclosure, the fourth determination unit includes a third determination sub-unit, a fourth determination sub-unit, and a fifth determination sub-unit.

The third determination sub-unit may be used to determine a first target set of environmental samples corresponding to a confidence information greater than a first predetermined threshold.

The fourth determination sub-unit may be used to determine a second target set of environmental samples corresponding to a confidence information less than a second predetermined threshold. The second predetermined threshold is less than the first predetermined threshold.

The fifth determination sub-unit may be used to determine the initial set of samples according to the first target set of environmental samples and the second target set of environmental samples.

According to embodiments of the present disclosure, the active learning includes at least one selected from: Uncertainty Sampling, Query-By-Committee, or Expected Model Change FIG. 7 schematically shows a block diagram of an apparatus of training a multimodal model according to embodiments of the present disclosure.

Figure 7:
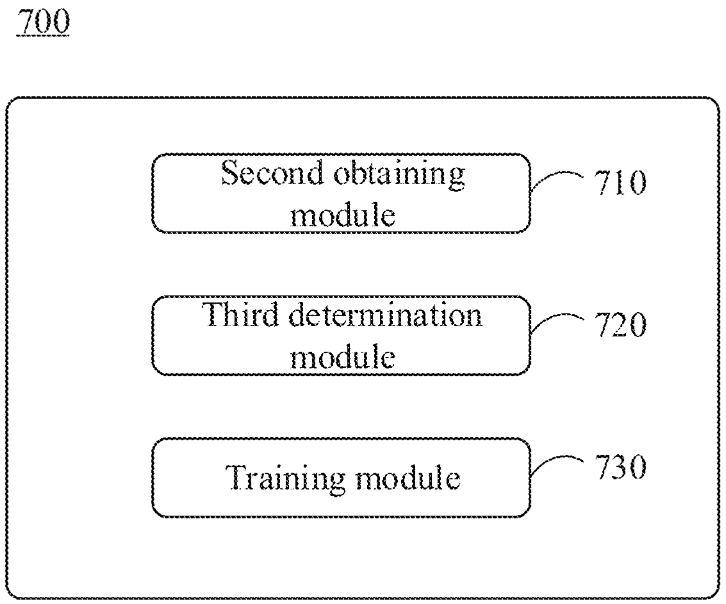
FIG. 7 schematically shows a block diagram of an apparatus of training a multimodal model according to embodiments of the present disclosure.

As shown in FIG. 7, an apparatus 700 of training a multimodal model includes a second obtaining module 710, a third determination module 720, and a training module 730.

The second obtaining module 710 may be used to input a second target set of samples in a multimodal set of samples into a target single-modal model matched with a modality of the second target set of samples, so as to obtain a plurality of single-modal features. The multimodal set of samples is determined according to the apparatus of generating the multimodal set of samples in embodiments of the present disclosure. The multimodal set of samples includes a plurality of second target sets of samples, and each second target set of samples corresponds to a modality. The target single-modal model is a trained single-modal model.

The third determination module 720 may be used to determine a multimodal fusion feature according to the plurality of single-modal features.

The training module 730 may be used to train the multimodal model according to the multimodal fusion feature.

According to embodiments of the present disclosure, the apparatus of training the multimodal model further includes a fifth determination unit and a third obtaining unit that are provided before the second obtaining module.

The fifth determination unit may be used to determine N deep learning models, where N is a positive integer.

The third obtaining unit may be used to train the N deep learning models by using N target sets of samples corresponding to N modalities respectively, so as to obtain the target single-modal model.

According to embodiments of the present disclosure, the third determination module includes a sixth determination unit and a seventh determination unit.

The sixth determination unit may be used to determine, for a single-modal feature among the plurality of single-modal features, a weight corresponding to the single-modal feature, according to a proportion of the single-modal feature in the plurality of single-modal features.

The seventh determination unit may be used to determine the multimodal fusion feature according to the plurality of single-modal features and the weights corresponding to the single-modal features.

Figure 8:
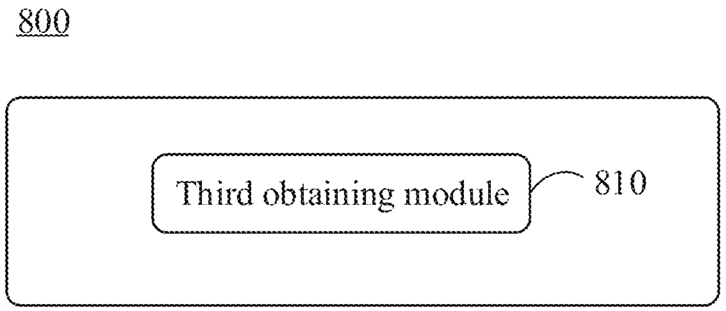
FIG. 8 schematically shows a block diagram of an apparatus of processing a multimodal information according to embodiments of the present disclosure.

FIG. 8 schematically shows a block diagram of an apparatus of processing a multimodal information according to embodiments of the present disclosure.

As shown in FIG. 8, an apparatus 800 of processing a multimodal information includes a third obtaining module 810.

The third obtaining module 810 may be used to input the multimodal information into a multimodal model to obtain a processing result. The multimodal model is trained by using the apparatus of training the multimodal model in embodiments of the present disclosure.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of generating the multimodal set of samples, the method of training the multimodal model and the method of processing the multimodal information provided by the present disclosure.

According to embodiments of the present disclosure, a non-transitory computer-readable storage medium having computer instructions therein is provided, and the computer instructions are used to cause a computer system to implement the method of generating the multimodal set of samples, the method of training the multimodal model and the method of processing the multimodal information provided by the present disclosure.

According to embodiments of the present disclosure, a computer program product containing a computer program is provided, and the computer program, when executed by a processor, causes the processor to implement the method of generating the multimodal set of samples, the method of training the multimodal model and the method of processing the multimodal information provided by the present disclosure.

Figure 9:
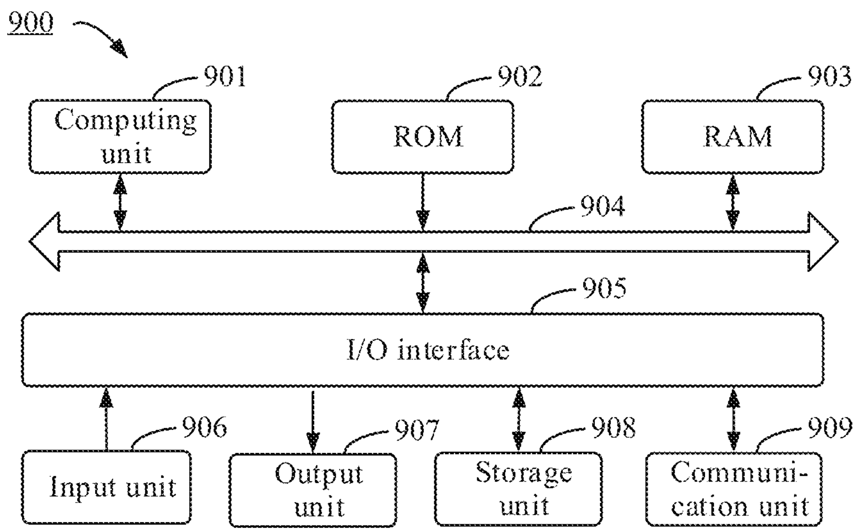
FIG. 9 shows a schematic block diagram of an example electronic device for implementing embodiments of the present disclosure.

FIG. 9 shows a schematic block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and processes described above, such as the method of generating the multimodal set of samples, the method of training the multimodal model and the method of processing the multimodal information. For example, in some embodiments, the method of generating the multimodal set of samples, the method of training the multimodal model and the method of processing the multimodal information may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of generating the multimodal set of samples, the method of training the multimodal model and the method of processing the multimodal information described above. Alternatively, in other embodiments, the computing unit 901 may be used to perform the method of generating the multimodal set of samples, the method of training the multimodal model and the method of processing the multimodal information by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of multimodal processing, comprising:

inputting an environmental sample that is one of a plurality of a collected multimodal set of environmental samples into a single-modal model matched with a modality of the environmental sample, so as to obtain a model processing result corresponding to the environmental sample;

determining an initial set of samples from the multimodal set of environmental samples according to the model processing result;

processing the initial set of samples by means of an active learning, so as to determine a multimodal set of samples;

determining a plurality of second target sets of samples from the multimodal set of samples, wherein each of the plurality of second target sets corresponds to a modality;

inputting each second target set of samples into a target single-modal model matched with the modality of the second target set of samples, so as to obtain a plurality of single-modal features, wherein the target single-modal model is a trained single-modal model;

determining a multimodal fusion feature according to the plurality of single-modal features; and training a multimodal model according to the multimodal fusion feature.

2. The method according to claim 1, wherein the active learning comprises a first active learning and a second active learning, and wherein the processing the initial set of samples by means of an active learning so as to determine the multimodal set of samples comprises:

processing the initial set of samples by means of the first active learning, so as to obtain an intermediate set of samples;

performing at least one round of processing on the intermediate set of samples by means of the second active learning, so as to obtain an intermediate subset of samples corresponding to the round; and determining the multimodal set of samples according to the intermediate subset of samples.

3. The method according to claim 2, wherein the determining the multimodal set of samples according to the intermediate subset of samples comprises:

determining an intermediate subset of labeled samples and a first subset of remaining samples as the multimodal set of samples, wherein the first subset of remaining samples is a set of samples in the intermediate set of samples other than the intermediate subset of labeled samples.

4. The method according to claim 2, wherein the determining the multimodal set of samples according to the intermediate subset of samples comprises:

determining an intermediate subset of labeled samples as the multimodal set of samples.

5. The method according to claim 2, wherein the at least one round comprises a first round to an $M^{th}$ round, and M is a positive integer, wherein the performing at least one round of processing on the intermediate set of samples by means of the second active learning so as to obtain an intermediate subset of samples corresponding to the round comprises:

processing, in the first round, the intermediate set of samples by means of the second active learning, so as to obtain an intermediate subset of samples corresponding to the first round; and processing, in an $m^{th}$ round, a second subset of remaining samples by means of the second active learning, so as to obtain an intermediate subset of samples corresponding to the $m^{th}$ round, wherein the second subset of remaining samples is a set of samples in the intermediate set of samples other than intermediate subsets of samples corresponding to first m−1 rounds, and wherein m is greater than 1 and less than or equal to M, and m is a positive integer.

6. The method according to claim 1, wherein the processing the initial set of samples by means of an active learning so as to determine the multimodal set of samples comprises:

determining a first target set of samples, wherein the first target set of samples is obtained by processing the initial set of samples by means of the active learning; and determining the first target set of samples as the multimodal set of samples.

7. The method according to claim 1, wherein the model processing result comprises a confidence information corresponding to the model processing result, and wherein the determining an initial set of samples from the multimodal set of environmental samples according to the model processing result comprises:

determining the initial set of samples from the multimodal set of environmental samples according to the confidence information.

8. The method according to claim 7, wherein the determining the initial set of samples from the multimodal set of environmental samples according to the confidence information comprises:

determining a first target set of environmental samples corresponding to a confidence information greater than a first predetermined threshold;

determining a second target set of environmental samples corresponding to a confidence information less than a second predetermined threshold, wherein the second predetermined threshold is less than the first predetermined threshold; and determining the initial set of samples according to the first target set of environmental samples and the second target set of environmental samples.

9. The method according to claim 1, wherein the active learning comprises at least one learning technique selected from: Uncertainty Sampling, Query-By-Committee, or Expected Model Change.

10. The method according to claim 1, further comprising: before inputting the second target set of samples in the multimodal set of samples into the target single-modal model matched with the modality of the second target set of samples, determining N deep learning models, wherein N is a positive integer; and training the N deep learning models by using N target sets of samples corresponding to N modalities respectively, so as to obtain the target single-modal model.

11. The method according to claim 1, wherein the determining a multimodal fusion feature according to the plurality of single-modal features comprises:

determining, for a single-modal feature among the plurality of single-modal features, a weight corresponding to the single-modal feature, according to a proportion of the single-modal feature in the plurality of single-modal features; and determining the multimodal fusion feature according to the plurality of single-modal features and the weights corresponding to the single-modal features.

12. A method of processing a multimodal information, comprising:

inputting the multimodal information into a multimodal model to obtain a processing result, wherein the multimodal model is trained by using the method of claim 1.

13. An electronic device, comprising:

at least one processor; and a memory communicatively connected to the at least one processor, wherein the memory stores instructions executable by the at least one processor, and the instructions, when executed by the at least one processor, are configured to cause the at least one processor to at least:

input an environmental sample that is one of a plurality of collected multimodal set of environmental samples into a single-modal model matched with a modality of the environmental sample, so as to obtain a model processing result corresponding to the environmental sample;

determine an initial set of samples from the multimodal set of environmental samples according to the model processing result;

process the initial set of samples by means of an active learning, so as to determine the multimodal set of samples;

determine a plurality of second target sets of samples from the multimodal set of samples, wherein each of the plurality of second target sets of samples corresponds to a modality;

input each second target set of samples into a target single-modal model matched with the modality of the second target set of samples, so as to obtain a plurality of single-modal features, wherein the target single-modal model is a trained single-modal model;

determine a multimodal fusion feature according to the plurality of single-modal features; and train a multimodal model according to the multimodal fusion feature.

14. The electronic device according to claim 13, wherein the active learning comprises a first active learning and a second active learning, and wherein the instructions are further configured to cause the at least one processor to at least:

process the initial set of samples by means of the first active learning, so as to obtain an intermediate set of samples;

perform at least one round of processing on the intermediate set of samples by means of the second active learning, so as to obtain an intermediate subset of samples corresponding to the round; and determine the multimodal set of samples according to the intermediate subset of samples.

15. An electronic device, comprising:

at least one processor; and a memory communicatively connected to the at least one processor, wherein the memory stores instructions executable by the at least one processor, and the instructions, when executed by the at least one processor, are configured to cause the at least one processor to implement the method of claim 1.

16. A non-transitory computer-readable storage medium having computer instructions therein, wherein the computer instructions are configured to cause a computer system to at least:

input an environmental sample that is one of a plurality of collected multimodal set of environmental samples into a single-modal model matched with a modality of the environmental sample, so as to obtain a model processing result corresponding to the environmental sample;

determine an initial set of samples from the multimodal set of environmental samples according to the model processing result;

process the initial set of samples by means of an active learning, so as to determine the multimodal set of samples;

determine a plurality of second target sets of samples from the multimodal set of samples, wherein each of the plurality of second target sets of samples corresponds to a modality;

input each second target set of samples into a target single-modal model matched with the modality of the second target set of samples, so as to obtain a plurality of single-modal features, wherein the target single-modal model is a trained single-modal model;

determine a multimodal fusion feature according to the plurality of single-modal features; and train a multimodal model according to the multimodal fusion feature.

17. A non-transitory computer-readable storage medium having computer instructions therein, wherein the computer instructions are configured to cause a computer system to implement the method of claim 1.

* * * * *